United States Patent [19]
Kitchen et al.

[11] Patent Number: 4,704,434
[45] Date of Patent: Nov. 3, 1987

[54] CRAZE-RESISTANT POLYMODAL LINEAR BLOCK COPOLYMERS WITH TERMINAL TAPERED BLOCKS

[75] Inventors: Alonzo G. Kitchen; Frank J. Szalla, both of Bartlesville, Okla.

[73] Assignee: Phillips Petroleum Company, Bartlesville, Okla.

[21] Appl. No.: 843,443

[22] Filed: Mar. 24, 1986

[51] Int. Cl.$^4$ .................. C08F 297/04; C08F 293/00
[52] U.S. Cl. .................... 525/250; 206/471; 525/271; 525/314
[58] Field of Search .................. 525/250, 271, 314

[56] References Cited

U.S. PATENT DOCUMENTS

| | | | |
|---|---|---|---|
| T953,011 | 12/1976 | Smith | 260/880 B |
| T967,004 | 2/1978 | Smith | 526/173 |
| 3,507,934 | 4/1970 | Minor et al. | 260/876 |
| 3,639,517 | 2/1972 | Kitchen et al. | 260/879 |
| 3,937,760 | 2/1976 | Cole et al. | 260/880 B |
| 3,987,006 | 10/1976 | Kitchen et al. | 260/45.85 N |
| 4,054,616 | 10/1977 | Miki et al. | 260/880 B |
| 4,073,831 | 2/1978 | Tabana et al. | 260/876 B |
| 4,080,407 | 3/1978 | Fodor | 260/880 B |
| 4,086,298 | 4/1978 | Fahrbach et al. | 260/880 B |
| 4,089,913 | 5/1978 | Miki et al. | 260/880 B |
| 4,117,037 | 9/1978 | Himes | 260/880 B |
| 4,120,915 | 10/1978 | Fodor et al. | 260/880 B |
| 4,122,134 | 10/1978 | Miki et al. | 260/880 B |
| 4,152,370 | 5/1979 | Moczygemba | 260/880 B |
| 4,163,764 | 8/1979 | Nash | 525/2 |
| 4,163,765 | 8/1979 | Moczygemba | 525/314 |
| 4,167,545 | 9/1979 | Fahrbach et al. | 525/122 |
| 4,180,530 | 12/1979 | Bi et al. | 525/98 |
| 4,208,356 | 6/1980 | Fukawa et al. | 525/89 |
| 4,221,884 | 9/1980 | Bi et al. | 525/314 |
| 4,248,980 | 2/1981 | Bi et al. | 525/271 |
| 4,248,981 | 2/1981 | Milkovich et al. | 525/271 |
| 4,248,982 | 2/1981 | Bi et al. | 525/271 |
| 4,248,983 | 2/1981 | Bi et al. | 525/314 |
| 4,248,984 | 2/1981 | Bi et al. | 525/314 |
| 4,335,221 | 6/1982 | Gerberding | 525/89 |
| 4,346,193 | 8/1982 | Warfel | 525/52 |
| 4,346,198 | 8/1982 | Doak et al. | 525/314 |
| 4,403,074 | 9/1983 | Moczygemba | 525/386 |
| 4,405,754 | 9/1983 | Moczygemba et al. | 525/102 |
| 4,418,180 | 11/1983 | Heinz et al. | 525/314 |

FOREIGN PATENT DOCUMENTS

| | | |
|---|---|---|
| 0046862 | 7/1981 | European Pat. Off. |
| 0153727 | 9/1985 | European Pat. Off. ............ 525/314 |

*Primary Examiner*—Wilbert J. Briggs, Sr.
*Attorney, Agent, or Firm*—Hal Brent Woodrow

[57] ABSTRACT

Sequential charging of initiator and monomers in a multistage solution polymerization process involving conjugated diene and monovinylaromatic monomers wherein the final charge is a mixture of these monomers results in the production of resinous polymodal linear block copolymers each with a terminal tapered block. A typical 5-stage charge sequence is as follows: Stage 1: $(S_i)$; Stage 2: $(S_i)$; Stage 3: (B); Stage 4: $(S_i)$; Stage 5: (S+B) wherein $(S_i)$ is monovinylaromatic monomer and initiator; (B) is conjugated diene monomer and (S+B) is monovinylaromatic monomer and conjugated diene monomer. At each stage, polymerization is allowed to continue until no free monomer is present.

The trimodal block copolymer products comprise high, medium and low molecular weight species designated, respectively, as $S_1\text{-}S_2\text{-}B_1\text{-}S_3\text{-}B_2 \rightarrow S_4$; $S_2\text{-}B_1\text{-}S_3\text{-}B_2 \rightarrow S_4$; and $S_3\text{-}B_2 \rightarrow S_4$ wherein $S_1$, $S_2$ and $S_3$ represent, respectively, polyvinylaromatic blocks resulting from polymerization of the first, second and third charges of monovinylaromatic monomer (stages 1,2 and 4); $B_1$ represents a polydiene block resulting from polymerization of the first charge of conjugated diene monomer (stage 3); and $B_2 \rightarrow S_4$ represents a terminal tapered copolymer block resulting from polymerization of the conjugated diene and monovinylaromatic monomers (stage 5).

The subject copolymers can be fabricated into sheets and molded objects possessing little color, a high degree of transparency and excellent impact resistance. These fabricated products do not craze on being impacted.

9 Claims, No Drawings

CRAZE-RESISTANT POLYMODAL LINEAR BLOCK COPOLYMERS WITH TERMINAL TAPERED BLOCKS

FIELD OF THE INVENTION

The invention relates to polymodal linear block copolymers with terminal tapered blocks.

In another aspect, the invention relates to a method of preparing polymodal linear block copolymers characterized by a terminal tapered block which involves sequential charging of initiator and monomers to the polymerization zone.

BACKGROUND OF THE INVENTION

Although substantially transparent block copolymers have been prepared by a variety of initiator and monomer charge sequences, the prior art materials such as described in U.S. Pat. No. 4,335,221 are not entirely satisfactory in regard to transparency, craze-resistance and color. Articles fabricated from some of the available block copolymers are characterized by low impact strength, a tendency to craze on being impacted, a blue coloration and a haziness particularly in thin sheets.

The deficiencies of available block copolymers are evident in packaging applications such as blister packs for bandages and syringes. These transparent colorless packs are intended to display and protect the contents and maintain a sterile atmosphere within the pack. Crazing of these packs due to squeezing during shipping is very undesirable because the crazed packs and their contents are discarded on the presumption that the sterile atmosphere within the pack has been contaminated by an air leak.

Thus, there is a need for block copolymers which possess the capacity to impart craze-resistance as well as transparency and little color to manufactured articles particularly in the packaging field.

INVENTION

Thus, it is an object of this invention to provide polymodal linear block copolymers which can be fabricated into products possessing craze-resistance, little color and a high degree of transparency.

Another object of this invention is to provide blister packaging possessing craze-resistance and a high degree of transparency.

Other aspects, objects and the several advantages of the invention will be apparent to those skilled in the art from the description and the appended claims.

The inventive copolymers can be prepared by sequentially charging monomers and initiator to the polymerization zone wherein at least one conjugated diene monomer is copolymerized with at least one monovinylaromatic (monovinylarene) monomer in a 5-stage charge sequence comprising:

Stage 1: ($S_i$): Initiator and monovinylaromatic monomer

Stage 2: ($S_i$): Initiator and monovinylaromatic monomer

Stage 3: (B): Conjugated diene monomer

Stage 4: ($S_i$): Initiator and monovinylaromatic monomer

Stage 5: (B and S): Conjugated diene monomer and monovinylaromatic monomer

At each stage, polymerization is allowed to continue until essentially no free monomer is present. The terminal tapered block is produced in the fifth stage by charging both monomers to the polymerization zone.

The instant polymodal linear block copolymers comprise high, medium and low molecular weight species designated, respectively, as $S_1$-$S_2$-$B_1$-$S_3$-$B_2 \rightarrow S_4$; $S_2$-$B_1$-$S_3$-$B_2 \rightarrow S_4$ and $S_3$-$B_2 \rightarrow S_4$ wherein $S_1$, $S_2$ and $S_3$ represent, respectively, polyvinylaromatic blocks resulting from polymerization of the first, second and third charges of monovinylaromatic monomer (stages 1, 2 and 4); $B_1$ represents a polydiene block resulting from polymerization of the first charge of conjugated diene monomer (stage 3); and $B_2 \rightarrow S_4$ represents a terminal tapered copolymer block resulting from the polymerization of the final charge (stage 5) of conjugated diene monomer and monovinylaromatic monomer.

The instant copolymers contain about 55 to 95 preferably 70 to 80 weight percent of monovinylaromatic monomer units and 45 to 5 preferably 30 to 20 weight percent conjugated diene monomer units based on total weight of monomers charged to the polymerization zone.

Broad and preferred ranges for practicing the instant process are summarized in Table A. The symbols L, S and B represent, respectively, organomonoalkali metal initiator such as n-butyllithium, monovinylaromatic monomer such as styrene and conjugated diene monomer such as 1,3-butadiene.

TABLE A

Monomer and Initiator Ranges for Producing Polymodal Copolymers

| Stage | # | Component | Broad Range | Preferred Range |
|---|---|---|---|---|
| 1 | ($S_i$) | L-1 (phm)[1,2] | 0.02–0.04 | 0.02–0.03 |
|   |   | L-1 (mhm)[3,4] | 0.312–0.625 | 0.312–0.625 |
|   |   | S-1 (phm) | 30–40 | 30–40 |
| 2 | ($S_i$) | L-2 (phm) | 0.02–0.04 | 0.02–0.03 |
|   |   | L-2 (mhm) | 0.312–0.625 | 0.312–0.469 |
|   |   | S-2 (phm) | 10–20 | 10–15 |
| 3 | (B) | B-1 (phm) | 15–2.5 | 10–4 |
| 4 | ($S_i$) | L-3 (phm) | 0.02–0.12 | 0.04–0.09 |
|   |   | L-3 (mhm) | 0.625–1.875 | 0.625 1.563 |
|   |   | S-3 (phm) | 10–20 | 20–10 |
| 5 | (B and S) | (B-2) (phm) | 30–2.5 | 20–16 |
|   |   | (S-4) (phm) | 5–15 | 10–15 |
| Totals |   | S (phm) | 55–95 | 70–80 |
|   |   | B (phm) | 45–5 | 30–20 |
|   |   | L (phm) | 0.06–0.20 | 0.08–0.15 |
|   |   | L (mhm) | 1.25–3.125 | 1.250–2.657 |

($S_i$) represents initiator and monovinylaromatic monomer; (B) represents conjugated diene monomer; (B and S) represents monovinylaromatic monomer and conjugated diene monomer: the conjugated diene was charged first followed immediately by the monovinylaromatic monomer.
*phm is based on total monomers charged.
[1]phm represents parts by weight per 100 parts by weight of total monomers.
[2]phm for L is based on n-butyllithium runs.
[3]mhm represents gram-millimoles of organomonoalkali metal initiator per 100 grams of total monomers.
[4]mhm for L is applicable for any organomonoalkali metal initiators based on the assumption that no poisons are present.

MONOMERS

The conjugated diene monomers contain 4 to 6 carbon atoms and include 1,3-butadiene, isoprene, 2-ethyl-1,3-butadiene; 2,3-dimethyl-1,3-butadiene and piperylene and mixtures thereof. Presently preferred is 1,3-butadiene.

The monovinylaromatic monomers contain 8 to 12 carbon atoms and include styrene, alpha-methylstyrene, p-vinyltoluene, m-vinyltoluene, o-vinyltoluene, 4-ethylstyrene, 3-ethylstyrene, 2-ethylstyrene, 4-tertbutylstyrene and 2,4-dimethylstyrene and mixtures thereof. Presently preferred is styrene.

POLYMERIZATION

The polymerization process is carried out in a hydrocarbon diluent at any suitable temperature in the range of −10° to 150° C. preferably in the range of 0° to 110° C. at pressures sufficient to maintain the reaction mixture substantially in the liquid phase. Preferred hydrocarbon diluents include linear and cycloparaffins such as pentane, hexane, octane, cyclohexane and mixtures thereof. Presently preferred is cyclohexane.

Small amounts of polar organic compounds such as tetrahydrofuran are required in the hydrocarbon diluent to improve the effectiveness of n-alkylmonoalkali metal initiators such as n-butyllithium. Amounts of tetrahydrofuran to provide from about 0.01 to 1.0 phm (parts per hundred parts of total monomer), preferably 0.02 to 0.1 phm are suitable.

The initiators can be any of the organomonoalkali metal compounds of the formula RM wherein R is an alkyl, cycloalkyl or aryl carbanion containing 4 to 8 carbon atoms and M is an alkali metal cation. The presently preferred initiator is n-butyllithium. Suitable amounts of organomonoalkali metal initiator are encompassed by the ranges given in Table A.

The polymerization is carried out in the substantial absence of oxygen and water preferably under an inert gas atmosphere. Prior to the termination treatment, the reaction mass contains a very high percentage of living molecules in which an alkali metal cation is positioned at one end of each polymer chain. Impurities in the feed such as water or alcohol reduce the amount of monoalkali metal living polymer in the reaction mass.

At the conclusion of the polymerization process, the system is treated as is known in the art with an active hydrogen compound such as water, alcohol, phenols or linear saturated aliphatic mono- and dicarboxylic acids to convert terminal carbon-lithium bonds on the living polymer molecules to carbon-hydrogen bonds resulting in the separation of copolymer. Preferably, the polymer cement, i.e., the polymer in the polymerization solvent, is treated with terminating agents (water and carbon dioxide) and then antioxidants before the solvent is flashed off to increase the solids content.

The resinous copolymers can be and usually are compounded with various additives such as release agents and the like before fabrication into useful articles such as molded objects and sheeting.

The following Examples illustrate the invention.

EXAMPLE I

This example describes the preparation of inventive polymodal linear block copolymers with one terminal tapered block. Styrene and 1,3-butadiene were copolymerized in a 5-stage process using n-butyl-lithium initiator. The runs were carried out under nitrogen in a two-gallon jacketed stainless steel reactor. The anhydrous reaction mixtures were stirred continuously during the polymerization process. Termination was effected by the conventional use of carbon dioxide and water. A mixture of Irganox 1076 (0.25 phm) and tris(nonylphenyl)phosphite (TNPP) (1.0 phm) was added prior to isolation of copolymer product. The inventive procedure is summarized in Table I.

TABLE I

| | | Polymodal Linear Block Copolymers with Terminal Tapered Blocks | | | | | | | |
|---|---|---|---|---|---|---|---|---|---|
| | | Run 1* | | | | Run 2# | | | |
| Stage[a] | Components[b] | Gm. | phm[c] | Polymerization Time (Min.) | Stage | Components | Gm. | phm | Polymerization Time (Min.) |
| 1($S_i$) | $C_6H_{12}$ | 2134 | 156 | 15 | 1($S_i$) | $C_6H_{12}$ | 2134 | 157 | 14 |
| | THF | 0.68 | 0.05 | | | THF | 0.68 | 0.05 | |
| | S | 445 | 32 | | | S | 435 | 32 | |
| | NBL | 0.34 | 0.025 | | | NBL | 0.408 | 0.03 | |
| 2($S_i$) | $C_6H_{12}$ | 182 | 13.2 | 16 | 2($S_i$) | $C_6H_{12}$ | 182 | 13.4 | 16 |
| | NBL | 0.34 | 0.025 | | | NBL | 0.34 | 0.025 | |
| | S | 177 | 13 | | | S | 177 | 13 | |
| 3(B) | $C_6H_{12}$ | 91 | 6.6 | 15 | 3(B) | $C_6H_{12}$ | 91 | 6.7 | 15 |
| | B | 136 | 10 | | | B | 82 | 6 | |
| 4($S_i$) | $C_6H_{12}$ | 91 | 6.6 | 16 | 4($S_i$) | $C_6H_{12}$ | 182 | 13.4 | 17 |
| | NBL | 0.408 | 0.03 | | | NBL | 0.408 | 0.03 | |
| | S | 231 | 17 | | | S | 204 | 15 | |
| 5(B and S) | $C_6H_{12}$ | 182 | 13.2 | 21 | 5(B and S) | $C_6H_{12}$ | 182 | 13.4 | 17 |
| | B | 177 | 13 | | | B | 258 | 19 | |
| | S | 204 | 15 | | | S | 204 | 15 | |

[a]The symbols $S_i$, B and S represent, respectively, styrene and n-butyllithium initiator; 1,3-butadiene; and styrene.
[b]The symbols $C_6H_{12}$, THF and NBL represent, respectively, cyclohexane, tetrahydrofuran and n-butyllithium.
[c]The symbol phm represents parts by weight of the designated component per 100 parts by weight of total monomers. In run 1, the total monomers charged amounted to 1370 grams. In run 2, the total monomers charged amounted to 1360 grams.
*The butadiene/styrene weight ratio in this run was 23/77.
The butadiene/styrene weight ratio in this run was 25/75.

Referring to the two invention runs in Table I, it is evident that the invention products were prepared in a 5-stage process involving three portions of styrene and initiator (stages 1, 2 and 4), one portion of 1,3-butadiene (stage 3) and a final portion of styrene and 1,3-butadiene (stage 5). This sequence of charging reactants to the polymerization zone results in a terminal tapered block on each high, medium and low molecular weight copolymer in the product.

As a result of the sequential charging of initiator in stages 1, 2 and 4 (i.e., 3 charges of initiator), the copolymer products obtained in runs 1 and 2 of Table I are referred to as polymodal, specifically trimodal. This term connotes the production of three molecular weight species: high, medium and low, arising by the initiation of new polymer chains in stages 1, 2 and 4. Thus, in stage 1, living polystyrene chains are initiated by n-butyllithium and propagation continues until no styrene monomer is present resulting ideally in $S_1$—Li living polymer chains of comparable molecular weight. The further addition of initiator and styrene (stage 2) results in the initiation of new polystyrene chains and propagation of the living $S_1$—Li chains initiated in stage 1. After two stages wherein all styrene monomer has been polymerized, the bimodal species can be represented as:

$S_1$-$S_2$-Li and $S_2$-Li wherein S denotes polystyrene blocks and subscripts indicate the stage of monomer addition. The addition of 1,3-butadiene at stage 3 results in the incorporation of the conjugated diene into each of the above living polymers to give bimodal copolymers:

$S_1$-$S_2$-$B_1$-Li and $S_2$-$B_1$-Li wherein $S_1$ and $S_2$ are polystyrene blocks and $B_1$ is a polybutadiene block.

In stage 4 additional styrene and n-butyllithium are introduced resulting in the initiation of new polystyrene chains and propagation of the existing $S_1$-$S_2$-$B_1$-Li and $S_2$-$B_1$-Li living polymers. After stage 4 wherein all monomer has been polymerized, the trimodal species can be represented as:

$S_1$-$S_2$-$B_1$-$S_3$-L; $S_2$-$B_1$-$S_3$-Li and $S_3$-Li designating high, medium and low molecular weight species. In stage 5 no additional initiator is charged so that the term trimodal is still descriptive of the copolymers produced.

In stage 5 both styrene and 1,3-butadiene are introduced. Preferably, the monomers are charged as a mixture. Alternatively, the 1,3-butadiene is momentarily charged before the styrene. The rate of polymerization of 1,3-butadiene is significantly greater than that of styrene so 1,3-butadiene is incorporated more rapidly leading to living copolymers with terminal blocks enriched in units from the diene. As the free 1,3-butadiene monomer concentration decreases, the living copolymers begin to incorporate both 1,3-butadiene and styrene monomers until a point is reached at which all the 1,3-butadiene has been incorporated and polymerization continues until all the styrene monomer has been incorporated. This results in a terminal tapered block enriched with styrene units at its terminal end preceded by a mixed zone of units derived from styrene and 1,3-butadiene in turn preceded by a block enriched in units derived from 1,3-butadiene. After stage 5 the high, medium and low molecular weight trimodal species are:

$S_1$-$S_2$-$B_1$-$S_3$-$B_2$→$S_4$-Li; $S_2$-$B_1$-$S_3$-$B_2$→$S_4$-Li and $S_3$-$B_2$→$S_4$-Li wherein $S_1$, $S_2$ and $S_3$ represent, respectively, polystyrene blocks resulting from polymerization of the first, second and third charges of styrene (stages 1, 2 and 4); $B_1$ represents a polybutadiene block resulting from polymerization of the first charge of 1,3-butadiene (stage 3) and $B_2$→$S_4$ represents a terminal tapered copolymer block resulting from polymer propagation in the presence of both 1,3-butadiene and styrene. After termination of the polymerization and product recovery, these species can be represented as:

$S_1$-$S_2$-$B_1$-$S_3$-$B_2$→$S_4$; $S_2$-$B_1$-$S_3$-$B_2$→$S_4$ and $S_3$-$B_2$→$S_4$.

EXAMPLE II

This example describes the preparation of linear block copolymers with one terminal tapered block in accordance with the prior art teaching of U.S. Pat. No. 4,335,221. Styrene and 1,3-butadiene were copolymerized in a 3-stage process using n-butyllithium initiator. The runs were carried out under nitrogen in a two-gallon jacketed stainless steel reactor. The anhydrous reaction mixtures were stirred continuously during the polymerization process. Termination was effected by the conventional use of carbon dioxide and water. The procedure is summarized in Table II.

TABLE II
Control Runs for Preparing Linear Block Copolymers with Terminal Tapered Blocks

| | Control Run* | | | | Control Run 2# | | | | |
|---|---|---|---|---|---|---|---|---|---|
| Stage[a] | Components[b] | Gm. | phm[c] | Polymerization Time (Min.) | Stage | Components | Gm. | phm | Polymerization Time (Min.) |
| 1($S_i$) | $C_6H_{12}$ | 2407 | 177 | 12 | 1($S_i$) | $C_6H_{12}$ | 2407 | 177 | 11 |
| | THF | 0.54 | 0.04 | | | THF | 0.54 | 0.04 | |
| | S | 571 | 42 | | | S | 571 | 42 | |
| | NBL | 0.34 | 0.025 | | | NBL | 0.34 | 0.025 | |
| 2($S_i$) | $C_6H_{12}$ | 182 | 13.4 | 18 | 2($S_i$) | $C_6H_{12}$ | 182 | 13.4 | 14 |
| | NBL | 0.95 | 0.07 | | | NBL | 0.95 | 0.07 | |
| | S | 218 | 16 | | | S | 218 | 16 | |
| 3(B and S) | $C_6H_{12}$ | 91 | 6.7 | 20 | 3(B and S) | $C_6H_{12}$ | 91 | 6.7 | 16 |
| | B | 340 | 25 | | | B | 340 | 25 | |
| | S | 231 | 17 | | | S | 231 | 17 | |

*The butadiene/styrene weight ratio in these runs (carried out in accordance with the teaching of U.S. 4,335,221) was 25/75.
[a]The symbols $S_i$, B and S represent, respectively, styrene and n-butyllithium initiator; 1,3-butadiene; and styrene.
[b]The symbols $C_6H_{12}$, THF and NBL represent, respectively, cyclohexane, tetrahydrofuran and n-butyllithium.
[c]The symbol phm represents parts by weight of the designated components per 100 parts by weight of total monomers. The total monomers charged amounted to 1360 grams.

Referring to the control runs in Table II, it is evident that the products were prepared in a 3-stage process involving two portions of styrene and initiator (stages 1 and 2) followed by a final portion of styrene and 1,3-butadiene (stage 3). This sequence of charging reactants to the polymerization zone results in a terminal tapered block on each high and low molecular weight copolymer in the product.

As a result of the sequential charging of initiator in stages 1 and 2 (i.e., 2 charges of initiator,) the copolymer products obtained in runs 1 and 2 of Table II are referred to as polymodal, specifically bimodal, in contrast to the trimodal inventive copolymers of Example I. The term bimodal connotes the production of two molecular weight species: high and low arising by the initiation of new polymer chains in stages 1 and 2. Thus, in stage 1, living polystyrene chains are initiated by n-butyllithium and propagation continues until no styrene monomer is present resulting ideally in $S_1$-Li living polymer chains of comparable molecular weight. The further addition of initiator and styrene (stage 2) results in the initiation of new polystyrene chains and propagation of the living $S_1$-Li chains initiated in stage 1. After two stages wherein all styrene monomer has been polymerized, the bimodal species can be represented as:

$S_1$-$S_2$-Li and $S_2$-Li wherein S denotes polystyrene blocks and subscripts indicate the stage of monomer addition. The addition of 1,3-butadiene and styrene in stage 3 with no additional initiator does not change the modality of the products.

In stage 3 both styrene and 1,3-butadiene are introduced to cause formation of tapered blocks. Preferably, the monomers are charged as a mixture. The rate of polymerization of 1,3-butadiene is significantly greater than that of styrene so 1,3-butadiene is incorporated more rapidly leading to living copolymers with terminal blocks enriched in units from the 1,3-butadiene. As the free 1,3-butadiene monomer concentration decreases, the living copolymers begin to incorporate both 1,3-butadiene and styrene monomers until a point is reached at which all the 1,3-butadiene has been incorporated and polymerization continues until all the styrene monomer has been incorporated. This results in a tapered 1,3-butadiene/styrene block enriched with styrene units at its terminal end preceded by a mixed zone of units derived from styrene and 1,3-butadiene in turn preceded by a block enriched with units derived from 1,3-butadiene. After stage 3 the high and low molecular weight bimodal species are:

$S_1$-$S_2$-$B_1$→$S_3$-Li and $S_2$-$B_1$→$S_3$-Li wherein $S_1$ and $S_2$ represent, respectively, polystyrene blocks resulting from polymerization of the first and second charges of styrene (stages 1 and 2) and $B_1$→$S_3$ represents a terminal tapered copolymer block resulting from polymer propagation in the presence of both 1,3-butadiene and styrene. After termination of the polymerization and product recovery, the high and low molecular weight bimodal species can be represented as:

$S_1$-$S_2$-$B_1$→$S_3$ and $S_2$-$B_1$→$S_3$.

The copolymer species present in the Example I products (inventive) and the copolymer species present in the Example II products (prior art copolymers) can be compared as below:

| | Inventive Copolymers (Trimodal) | Prior Art Copolymers (Bimodal; U.S. 4,335,221) | |
|---|---|---|---|
| High Mol. Wt. | $S_1$-$S_2$-$B_1$-$S_3$-$B_2$→$S_4$ | High Mol. Wt. | $S_1$-$S_2$-$B_1$→$S_3$ |
| Medium Mol. Wt. | $S_2$-$B_1$-$S_3$-$B_2$→$S_4$ | | |
| Low Mol. Wt. | $S_3$-$B_2$→$S_4$ | Low Mol. Wt. | $S_2$-$B_1$→$S_3$ |

EXAMPLE III

This example compares the properties exhibited by test samples of invention copolymers (trimodal) with the properties of test samples prepared from the control copolymers (bimodal). The invention copolymers were prepared by the procedure summarized in Table I of Example I. The control copolymers were prepared by the procedure summarized in Table II of Example II. The comparative results are compiled in Table III.

TABLE III

| | Comparison of Invention Copolymers and Control Copolymers | | | |
|---|---|---|---|---|
| | Control Polymers* (Runs 1 and 2 of Example II) | | Invention Polymers (Runs 1 and 2 of Example I) | |
| Property | | | | |
| Melt Flow (200° C., 5 Kg Wt) | 13.3 | 6.1 | 7.2 | 10.4 |
| Haze, % (50 mil specimen) | 1.0 | 2.9 | 1.1 | 1.1 |
| Hunter (-) "b" value | 14.7 | 24.7 | 4.6 | 6.0 |
| Flex. Mod., psi × $10^3$ | 163 | 151 | 181 | 172 |
| Tensile Yield, psi | 3635 | 3360 | 4900 | 4190 |
| Hardness, Shore D | 65 | 67 | 71 | 67 |
| Vicat Temp. °F. | 174 | 183 | 170 | 174 |
| Elongation % | 264 | 219 | 326 | 373 |
| Gardner Impact, in-lbs | 104 | 88 | 104 | 100 |
| $M_W × 10^{-3}$ | 122 | 158 | 135 | 112 |
| $M_N × 10^{-3}$ | 86 | 89 | 100 | 90 |
| HI | 1.42 | 1.75 | 1.35 | 1.25 |
| $M_W$ Distribution | Bimodal | Bimodal | Trimodal | Trimodal |
| Craze Resistant | No | No | Yes | Yes |

*Control copolymers were prepared in accordance with the teaching of U.S. 4,335,221.

Referring to the summary in Table III, it is evident that the trimodal invention copolymers were clearly superior to the bimodal control copolymers in regard to blueness in that the Hunter (-) "b" values are lower for the instant copolymers indicating a very slight blue tint (values 4.6 and 6.0) compared to the distinct blueness in the control copolymers (values 14.7 and 24.7). In regard to % Haze and Gardner Impact values, the invention copolymers and control copolymers were comparable; however, the bimodal control copolymers crazed on being impacted whereas the instant trimodal copolymers did not craze on being impacted.

Reasonable variations and modifications of the present invention which will become apparent to those skilled in the art can be made in this invention without departing from the spirit and scope thereof.

That which is claimed is:

1. A sequential mode of block copolymerization comprising:

polymerizing under solution polymerization conditions at least one monovinylaromatic monomer containing 8 to 12 carbon atoms and at least one conjugated diene monomer containing 4 to 6 carbon atoms in a ratio of about 55 to 95 weight percent monovinylaromatic monomer and 45 to 5 weight percent conjugated diene monomer, by a sequential charge polymerization process wherein at least two separate charges consisting of said monovinylaromatic monomer and an organomonoalkali metal initiator precede a separate charge of conjugated diene monomer followed by an additional separate charge of said monovinylaromatic monomer and said initiator before a final charge of said monovinylaromatic monomer and said conjugated diene monomer; each monomer charge polymerizes to substantial completion prior to addition of any subsequent charge;

wherein said sequential charge polymerization process employs a 5-stage charge sequence:

Stage 1: ($S_i$)
Stage 2: ($S_i$)
Stage 3: (B)
Stage 4: ($S_i$)
Stage 5: (B and S)

wherein ($S_i$) represents organomonoalkali metal initiator and monovinylaromatic monomer, (B) represents conjugated diene monomer and (B and S) represents conjugated diene monomer and monovinylaromatic monomer thereby producing polymodal, craze-resistant, low color, transparent linear resinous copolymers each with a terminal tapered copolymer block of said monomers.

2. The process of claim 1 employing ranges of monomer additions and of organomonoalkali metal initiator added at each stage:

| Stage 1: | L-1 (mhm) | 0.312–0.625 |
|---|---|---|
| | S-1 (phm) | 30–40 |
| Stage 2: | L-2 (mhm) | 0.312–0.625 |
| | S-2 (phm) | 10–20 |
| Stage 3: | B-1 (phm) | 15–2.5 |
| Stage 4: | L-3 (mhm) | 0.625–1.875 |
| | S-3 (phm) | 10–20 |
| Stage 5: | B-2 (phm) | 30–2.5 |
| | S-4 (phm) | 5–15 |
| Totals: | S (phm) | 55–95 |
| | B (phm) | 45–5 |
| | L (mhm) | 1.25–3.125 | wherein L represents organomonoalkali metal initiator, B represents conjugated diene monomer and S represents monovinylaromatic monomer.

3. The process of claim 2 employing ranges of monomer additions and of organomonoalkali metal initiator added at each stage:

| Stage 1: | L-1 (mhm) | 0.312–0.625 |
|---|---|---|
| | S-1 (phm) | 30–40 |
| Stage 2: | L-2 (mhm) | 0.312–0.469 |
| | S-2 (phm) | 10–15 |
| Stage 3: | B-1 (phm) | 10–4 |
| Stage 4: | L-3 (mhm) | 0.625–1.563 |
| | S-3 (phm) | 20–10 |
| Stage 5: | B-2 (phm) | 20–16 |
| | S-4 (phm) | 10–15 |
| Totals: | S (phm) | 70–80 |
| | B (phm) | 30–20 |
| | L (mhm) | 1.25–2.657 | wherein L represents organomonoalkali metal initiator, B represents conjugated diene monomer and S represents monovinylaromatic monomer.

4. The process of claim 1 employing 1,3-butadiene as said conjugated diene monomer, styrene as said monovinylaromatic monomer and n-butyllithium as said organomonoalkali metal initiator.

5. Polymodal linear block copolymers produced in accordance with the process of claim 1.

6. Polymodal linear block copolymers of 1,3-butadiene and styrene with terminal tapered blocks produced in accordance with the process of claim 4.

7. Blister packs comprising the polymodal linear block copolymers with terminal tapered blocks produced in accordance with the process of claim 1.

8. Blister packs comprising the polymodal linear block copolymers of 1,3-butadiene and styrene with terminal tapered blocks produced in accordance with the process of claim 4.

9. The process of claim 1 wherein in stage 1 the charge includes 0.01 to 1.0 phm of tetrahydrofuran based on the total amount of monomers charged.

* * * * *